United States Patent [19]

Woods

[11] Patent Number: 5,020,287
[45] Date of Patent: Jun. 4, 1991

[54] STRUCTURAL BUILDING COMPONENTS INCORPORATING INTEGRATED HYPERBOLIC PARABOLOID ELEMENTS

[76] Inventor: Ray A. Woods, P. O. Box 1, Cleo Springs, Okla. 73729

[21] Appl. No.: 455,220

[22] Filed: Dec. 22, 1989

[51] Int. Cl.⁵ .............................................. E04B 1/32
[52] U.S. Cl. .................................. 52/81; 52/DIG. 10
[58] Field of Search ...................... 52/DIG. 10, 80, 81

[56] References Cited

U.S. PATENT DOCUMENTS

| 3,221,464 | 12/1965 | Miller | 52/DIG. 10 |
| 3,568,381 | 3/1971 | Hale | 52/DIG. 10 |
| 3,757,478 | 9/1973 | Pryor | 52/80 |
| 3,798,849 | 4/1974 | Biggs et al. | 52/80 |
| 4,137,679 | 2/1979 | Tully | 52/73 |
| 4,651,479 | 3/1987 | Kersavage | 52/80 |

OTHER PUBLICATIONS

Cundy & Rollett *Mathematical Models* p. 129, p. 136 Plate 3 (d) 2nd Edition 1961.

*Primary Examiner*—David A. Scherbel
*Assistant Examiner*—Robert Canfield
*Attorney, Agent, or Firm*—Robert K. Rhea

[57] ABSTRACT

A family of structural building components formed from a plurality of integrated hyperbolic paraboloid elements which have a common midpoint, linear edges and allow for the prestressing of reinforcing elements along straight lines. The components can be reduced into independent modular parts and nesting units.

1 Claim, 3 Drawing Sheets

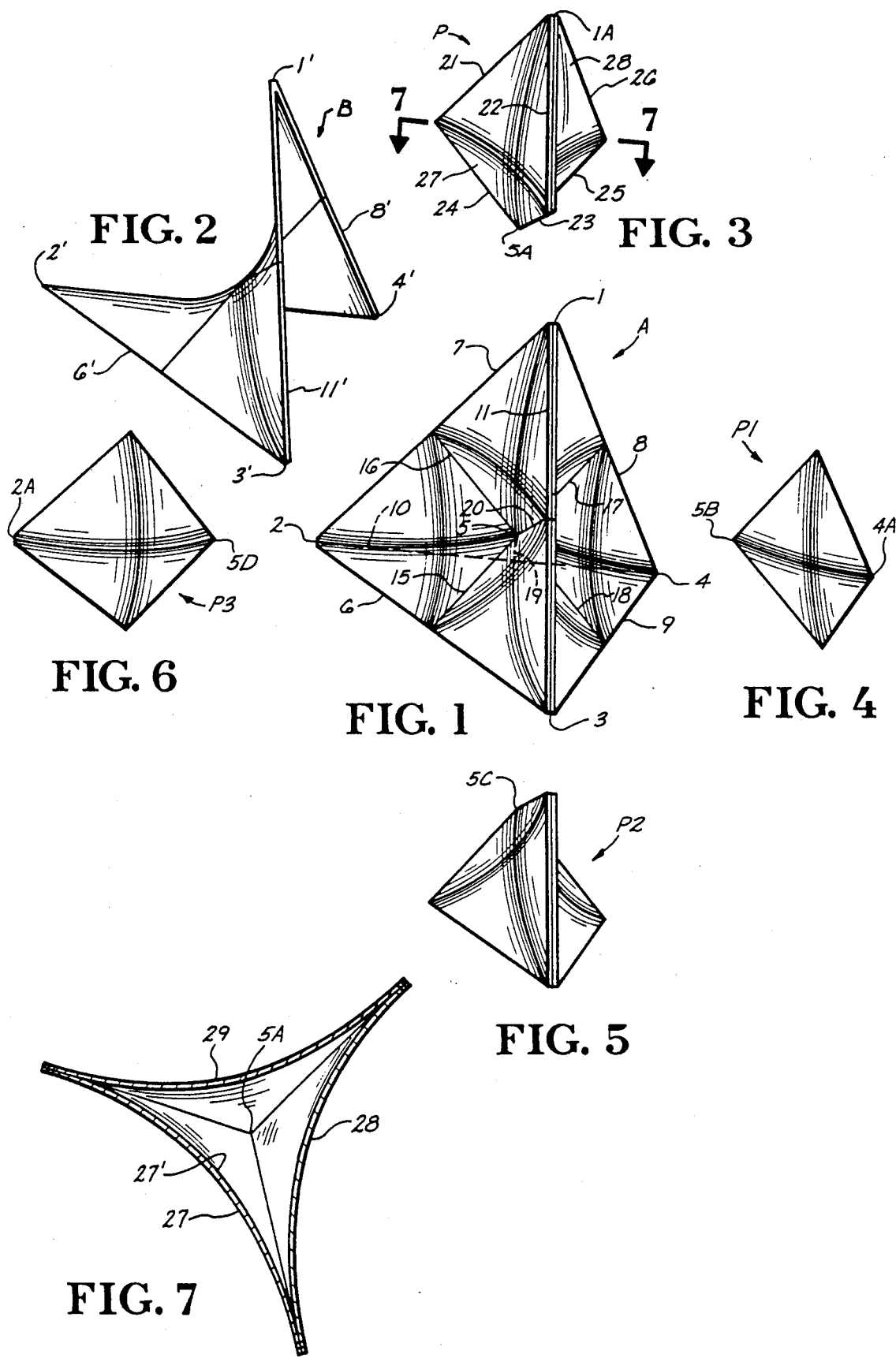

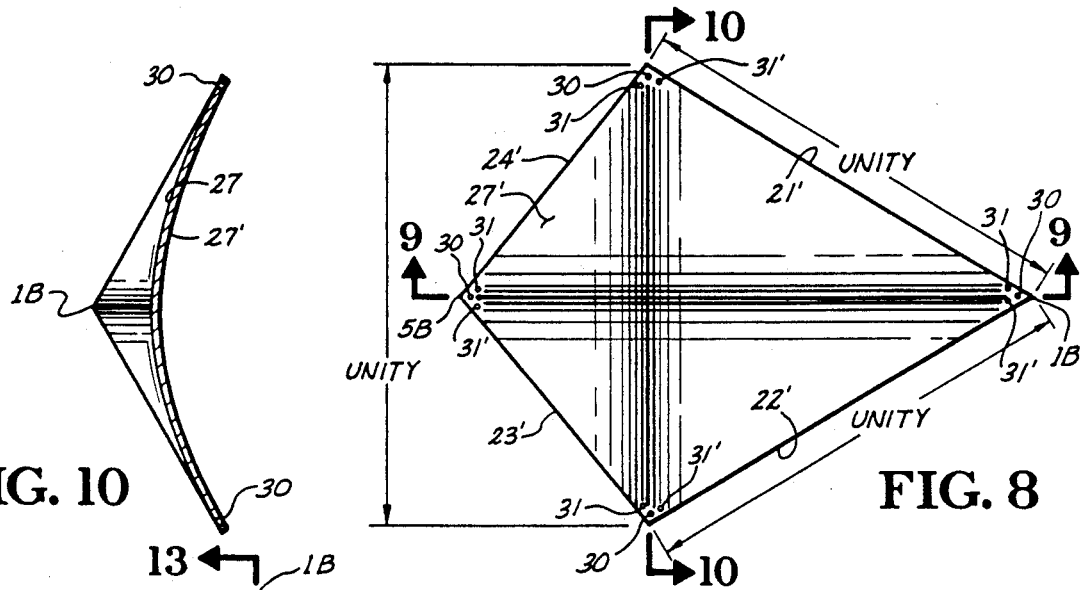
FIG. 10
FIG. 8
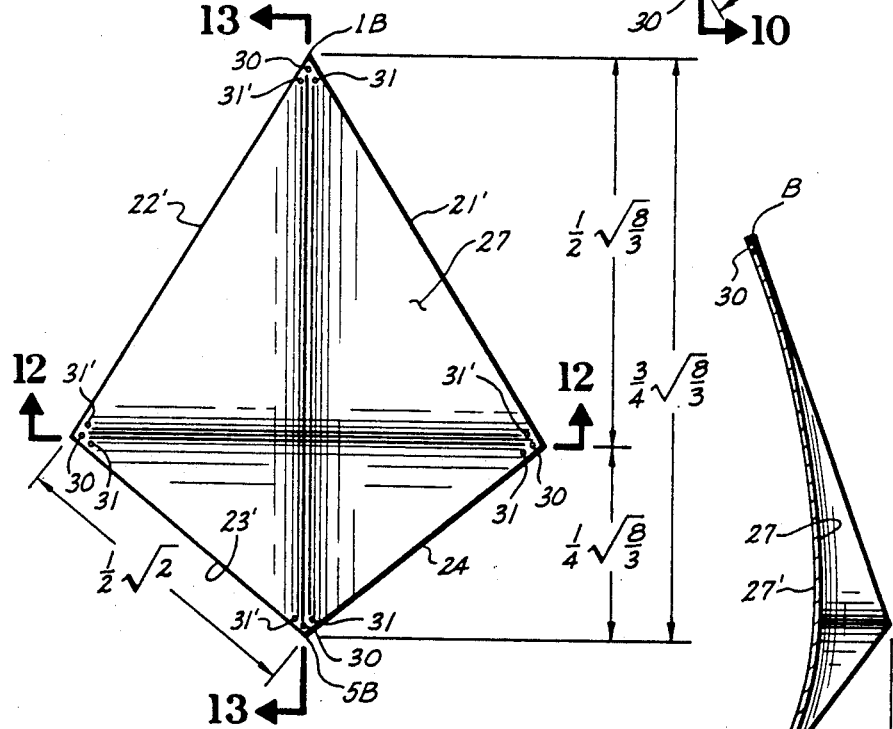
FIG. 11
FIG. 13
FIG. 12
FIG. 9

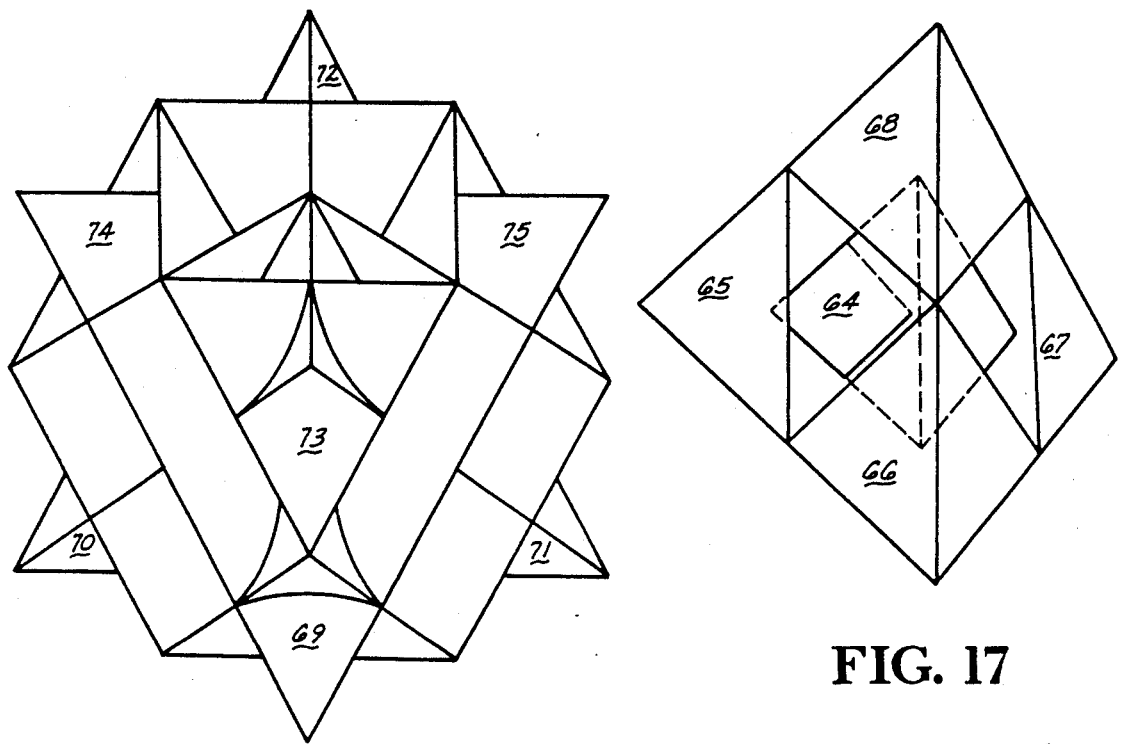
FIG. 18
FIG. 17
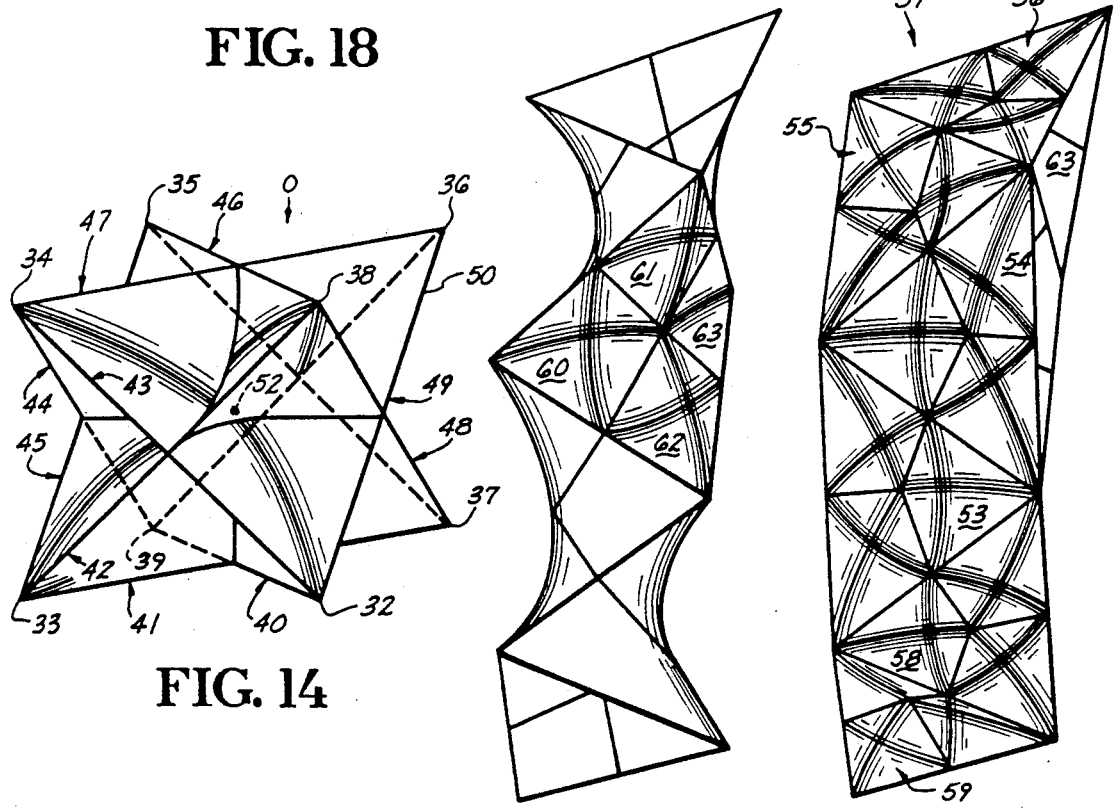
FIG. 14
FIG. 16
FIG. 15

1

STRUCTURAL BUILDING COMPONENTS INCORPORATING INTEGRATED HYPERBOLIC PARABOLOID ELEMENTS

BACKGROUND OF THE INVENTION

1. Field of the invention

This invention relates to structural components and substantially expands the usefulness of the hyperbolic paraboloid elements relating to structures of all types, and in particular to the building industry. Integrating or weaving together hyperbolic paraboloid elements allows structural configurations to be increased in size and also in variety of application. This invention further provides for the reduction of the structural components into modular or nesting units which has unlimited applications in space structures where exotic materials of superstrength can be utilized.

Furthermore, the unique geometric configuration of the hyperbolic paraboloids incorporated into the structural building components, allows for the reinforcing elements to be prestressed along straight lines, creating the potential for extremely strong, light and rigid components. This same prestressing technique can be applied inexpensively to the present building components.

2. Description of the prior art

The hyperbolic paraboloid configuration has been utilized successfully for a number of years in the building industry and has been applied in the shape of the potato chip presently marketed under the trademark Pringle.

U.S. Pat. Nos. 3,757,478; 3,798,849; and 4,651,479, describe the geometry and mechanics of the hyperbolic paraboloid. The most pertinent patent is believed to be U.S. Pat. No. 4,137,679 which discloses a building unit comprising a column adapted to be fitted to a foundation for supporting a plurality of identical hyperbolic paraboloid shells. This patent uses hyperbolic paraboloid elements as compression members.

This invention is distinctive over this patent by integrating and weaving together hyperbolic paraboloid shells into an autonomous structural building element. Another difference is that this invention utilizes both the compression and tensile properties of the hyperbolic paraboloid element allowing a substantial increase in the number of configurations without columns, supports or additional framework.

SUMMARY OF THE INVENTION

A structural or building component is formed by utilizing three hyperbolic paraboloid elements which intersect at a common midpoint and at six linear edges. The resulting enclosed three dimensional shape has four vertices and six edges like a tetrahedron but unlike a tetrahedron, which has four faces, this component has four areas comprised of three small hyperbolic paraboloid surfaces which curve into the components common midpoint. This component can be divided into four parts by making a cut from the midpoint of each of the six edges to the common midpoint. The four resulting parts are three sided enclosed shapes made up of six linear edges and three smaller hyperbolic paraboloid surfaces.

For construction purposes each of the three sided shapes can be separated along its six edges, resulting in three small independent hyperbolic paraboloid nesting units each bounded by linear edges.

A more complex structural or building component may be made from six hyperbolic paraboloid elements which intersect at a common midpoint and has twelve linear edges. The resulting enclosed three dimensional component has eight vertices and twelve edges like a cube but unlike a cube this complex component has hyperbolic paraboloid surfaces which curve and converge to a common midpoint. This structural or building component also has six sets of linear intersecting edges. This component with eight vertices, like the component with four vertices, may be constructed with its linear edges of equal length and similarly subdivided into eight parts or twenty four identical nesting units.

A plurality of the structural building components with four vertices may be attached or integrated to form a helix coil. Selected nesting units can then be removed internally and from the perimeter of the coil until a helically coiled tube is defined.

Another type of structural component integration is an array of five of the components with four vertices arranged in a manner where the component at the midpoint of the array is attached by its four vertices to the midpoint of each of the four outboard components. This array retains a tetrahedral form and can be expanded in this manner to form larger and larger arrays.

The component with eight vertices can be arrayed in a cubic configuration but unlike the tetrahedral array which attaches at the vertices and midpoint, the cubic array attaches along its linear edges.

The principal object of the invention is to provide a family of structural building components formed from a plurality of integrated hyperbolic paraboloid elements which have a common midpoint and linear edges and allow for the prestressing of reinforcing elements along straight lines. Other objectives and applications are to make the disclosed structural elements available in the form of modular toy structural models so that the tetrahedral and geodesic configurations can be better understood and developed.

BRIEF DESCRIPTION OF THE DRAWINGS

FIG. 1 is a view of one structural building component formed by integrating three hyperbolic paraboloid elements;

FIG. 2 is a view of one of the basic hyperbolic paraboloid elements forming the component of FIG. 1, per se;

FIGS. 3, 4, 5, and 6, respectively, are views of the four parts forming the component illustrated by FIG. 1 in respective outwardly exploded relation;

FIG. 7 is a horizontal cross sectional view, to a larger scale, taken substantially along the line 7—7 of FIG. 3;

FIG. 8 is a plan view of the smallest unit of the several structural building components, per se;

FIGS. 9 and 10 are vertical cross sectional views taken substantially along the lines 9—9 and 10—10, respectively, of FIG. 8;

FIG. 11 is a view similar to FIG. 8 of the opposite surface of the unit shown by FIG. 8;

FIGS. 12 and 13 are vertical cross sectional views taken substantially along the lines 12—12 and 13—13, respectively, of FIG. 11;

FIG. 14 is a view of a structural building component formed by integrating six of the hyperbolic paraboloid elements illustrated by FIG. 2;

FIG. 15 is a view of a plurality of the building components illustrated by FIG. 1 joined in triangular face to face relationship forming a helix;

FIG. 16 is a view similar to FIG. 15 with selected nesting units removed forming a helix tube;

FIG. 17 is a view of a plurality of integrally joined structural building components illustrated by FIG. 1 forming a tetrahedral array; and, FIG. 18 is a view of a plurality of integrally joined structural building components illustrated by FIG. 14 forming a cubic array.

DESCRIPTION OF THE PREFERRED EMBODIMENTS

Like characters of reference designate like parts in those figures of the drawings in which they occur.

In the drawings:

Referring first to FIG. 1 a structural component is formed by simultaneously integrating or weaving together three hyperbolic paraboloid elements, only one being shown, per se (FIG. 2). This component has four vertices 1, 2, 3, and 4, and a common midpoint 5. The boundaries of the component define triangular shapes and six linear edges 6, 7, 8, 9, 10 and 11. Each of the four areas bounded by any three intersecting edges are similar and are formed from a portion of each of three hyperbolic paraboloid elements, as presently described, structured so that they curve and converge at the midpoint 5. This component is geometrically unique and will herein be referred to as a "tetralith" A.

There is no intent to limit the present invention to a structural component where the six linear edges are of equal length. Such a component with edges which are not equal in length results in parts and nesting units which are not necessarily modular and identical in shape. But in all cases such a component can be subdivided into four parts or twelve nesting units.

FIG. 2 illustrates a typical hyperbolic paraboloid element B which can be constructed from a variety of materials such as reinforced concrete, plastic impregnated fiberglass or more exotic materials such as carbon filaments and plastic, marketed under the trademark Mylar, as a bonding agent. This can be accomplished by stringing tensioning reinforcing elements between a frame, not shown, and applying plaster to the reinforcing elements, or using a chopper gun using conventional plastic impregnated fiberglass techniques. The surface of the hyperbolic paraboloid element B has unique properties in that from any point on the surface the curvature is both hyperbolic and parabolic as described by the above referred to U.S Pat. No. 3,789,849. The hyperbolic paraboloid elements B used in the tetralith A are designed so that from any given point on the surface of the element B two straight lines can, respectively, be projected between opposing linear edges through that point. This makes it possible, if desired, for all reinforcing members used in the tetralith to be placed under tension and later released, thus producing prestressed structural components with outstanding rigidity and strength.

The edges 6', 8', 10' and 11' of the hyperbolic paraboloid element B, as illustrated by FIG. 2, are respectively common to the like numbered edges 6, 8, 10 and 11 of the tetralith A. As mentioned hereinabove, when three of the elements B are merged or constructed simultaneously they form the tetralith A.

Referring again to FIG. 1 the tetralith A can be divided into four parts by six cuts 15, 16, 17, 18, 19 and 20 illustrated by the bold lines extending from the midpoint of each of the edges 6-11 to the midpoint 5 of the tetralith thus dividing it into four identical parts P, P1, P2 and P3, as illustrated by FIGS. 3, 4, 5 and 6, respectively. Each of these parts is also geometrically unique and will hereinafter be referred to as a "phil" P. Each phil P has six linear edges 21, 22, 23, 24, 25 and 26 (FIG. 3) and three faces 27, 28 and 29 (FIGS. 3 and 7). Each of the faces 27, 28 and 29, respectively, are the outward surface of relatively small hyperbolic paraboloid elements, each a basic unit of the herein described larger structural elements. The remaining phils P1, P2 and P3 (FIGS. 4, 5 and 6) are similar to the phil P.

A phil P is the simplest three dimensional mathematical solid which can be constructed entirely from straight line elements. The proportions of a phil are aesthetically pleasing and can be used architecturally as a solid supporting column by filling the void between the elements with concrete. Because of its simplicity, the phil can be used for decorative and artistic purposes.

Because of the unique nature of the small hyperbolic paraboloid elements forming the faces 27, 28, and 29 (FIGS. 3 and 7) it is expedient to refer to each hyperbolic paraboloid element defining one of the three faces (27, 28 and 29) of a phil as a "rayplane" R, presently described in more detail.

When the tetralith A is dimensioned with its vertices 1-4 equidistantly spaced its linear edges 6-11 are of equal length and the four phils (FIGS. 3, 4, 5 and 6) are modular and interchangeable. Similarly all of the rayplanes making up the respective phils are modular and interchangeable as will presently be obvious. Referring to FIG. 8, the four edges 21', 22', 23' and 24' of the substantially diamond-shaped rayplane R are linear. Edges 21' and 22' are of equal length and edges 23' and 24' are of equal length. The opposing faces 27 and 27' of the rayplane R (FIG. 7), are a curved hyperbolic paraboloid surface formed by straight line elements extending between edges 21' and 23' and between edges 22' and 24'. When the length of the edge 21' and the edge 22' are assigned a value of one or unity then the following dimensions can be arrived at by the use of trigonometry. Sides 23' and 24' have a length of one half of the square root of two ($\frac{1}{2}\sqrt{2}$). The distance between vertices 1B and 5B is three fourths the square root of eight thirds ($\frac{3}{4}\sqrt{8/3}$). The distance between the remaining two vertices of the modular rayplane R is the square root of one or unity. The intriguing and unique nature of the modular rayplane is that the dimensions making up the element are composed entirely of irrational numbers.

Adjacent its respective vertex the rayplane R is provided with a plurality (3) selectively spaced apertures 30, 31 and 31' for receiving fastening members such as bolts and overlying and underlying plates, neither being shown, for securely connecting the several units and components.

FIG. 14 is a view of a more complex building unit of hyperbolic paraboloid elements B arranged to have a common midpoint 52. This component has eight vertices 32, 33, 34, 35, 36, 37, 38 and 39 and twelve linear edges 40, 41, 42, 43, 44, 45, 46, 47, 48, 49, 50 and 51. Each of the six faces are similar and are so structured that their surfaces curve and converge at the midpoint 52. The component has six pairs of intersecting edges 40-41, 42-43, 44-45, 46-47, 48-49, and 50-51. The component is geometrically unique and will hereinafter be referred to as an "octalith" O. An octalith O can be disassembled into eight phils P or twenty four rayplanes R.

As illustrated by FIG. 15 a series of tetraliths 53, 54, 55, 56, 57, 58 and 59 are joined in selected face to face relation to form a helical coil. FIG. 16 illustrates a tetrahelix coiled tube similar to FIG. 15 with the exception selected rayplanes have been removed internally and externally leaving a minimum number of rayplanes 60, 61, 62 and 63 for each convolution of the helix coil.

Throughout the organic realm of nature the helix coil is utilized extensively and in particular the structuring of the DNA molecule. By inventing the tetrahelix coil tube it is now possible to extend many organic qualities into structural building elements which in turn replace trusses and beams in many applications where tensile strength and weight are critical.

FIG. 17 illustrates five tetraliths A, numbered 64, 65, 66, 67 and 68 arranged so that the tetralith 64 is attached by its four vertices to the midpoint of tetraliths 65, 66, 67 and 68. The outboard tetraliths (65, 66, 67 and 68) are attached to each other at six common vertices thus making up a basic "tetralith array". The tetralith array being tetrahedral in form and having its midpoint accessable to other like tetralith arrays allows this structure to be expanded into larger and larger tetralith arrays.

FIG. 18 illustrates eight octaliths O, numbered 69, 70, 71, 72, 73, 74, 75 (one not visable), arranged in cubical fashion and attached at common edges and vertices, forming an "octalith array" which can be expanded in a cubical manner into larger and larger octalith rays.

Whereas specific materials of construction have been referred to herein, it is not intended to limit the invention to such. While a basic preferred embodiment has been shown and described it should be understood that there is no intent to limit the invention by such disclosure. But rather it is intended to cover all aspects and configurations falling within the spirit and scope of this basic invention and appended claims.

I claim:
1. A structural building element comprising:
   six hyperbolic paraboloid elements integrated in intersecting relation at a common midpoint for forming an octalith having eight vertices and twelve linear edges in which pairs of the linear edges intersect at six points.

* * * * *